(12) United States Patent
Lee

(10) Patent No.: US 8,494,748 B2
(45) Date of Patent: Jul. 23, 2013

(54) METHOD FOR CONTROLLING ENGINE TORQUE IN HYBRID VEHICLE

(75) Inventor: Young Dae Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 1167 days.

(21) Appl. No.: 12/288,755

(22) Filed: Oct. 23, 2008

(65) Prior Publication Data

US 2010/0004831 A1 Jan. 7, 2010

(30) Foreign Application Priority Data

Jul. 1, 2008 (KR) .................. 10-2008-0063265

(51) Int. Cl.
- *B60T 7/12* (2006.01)
- *G05D 1/00* (2006.01)
- *G06F 7/00* (2006.01)
- *G06F 17/00* (2006.01)

(52) U.S. Cl.
USPC ............................................................ 701/84

(58) Field of Classification Search
USPC .............................................. 701/22, 36, 84
See application file for complete search history.

(56) References Cited

U.S. PATENT DOCUMENTS

| 6,077,186 A * | 6/2000 | Kojima et al. ............... 477/3 |
| 6,543,397 B2 * | 4/2003 | Sandberg et al. .......... 123/41.15 |
| 7,055,486 B2 * | 6/2006 | Hoff et al. ................. 123/196 R |
| 7,314,425 B2 * | 1/2008 | Ito et al. ......................... 477/5 |
| 7,395,803 B2 * | 7/2008 | Ledger et al. ............. 123/196 R |
| 7,908,913 B2 * | 3/2011 | Cinpinski et al. ........... 73/114.79 |
| 7,921,710 B2 * | 4/2011 | Cinpinski et al. ........... 73/114.79 |

FOREIGN PATENT DOCUMENTS

| JP | 11-117782 | 4/1999 |
| JP | 2000-204987 | 7/2000 |
| JP | 2005206021 A | 8/2005 |
| JP | 2006-347430 | 12/2006 |
| JP | 2007320388 A | 12/2007 |
| KR | 10-0819323 | 3/2008 |

* cited by examiner

*Primary Examiner* — Dalena Tran
*Assistant Examiner* — Harry Oh
(74) *Attorney, Agent, or Firm* — Edwards Wildman Palmer LLP; Peter F. Corless

(57) ABSTRACT

The present invention provides a method for controlling engine torque in a hybrid vehicle, in which a point of time when an intake cam is activated is determined such that an engine demand torque is controlled to a level at which system efficiency is maximized within a limited engine output range before activation of the intake cam and the engine demand torque is controlled to a level at which the system efficiency is maximized after activation of the intake cam.

7 Claims, 3 Drawing Sheets

METHOD FOR CONTROLLING ENGINE TORQUE IN HYBRID VEHICLE

CROSS-REFERENCE TO RELATED APPLICATION

This application claims under 35 U.S.C. §119(a) the benefit of Korean Patent Application No. 10-2008-0063265 filed Jul. 1, 2008, the entire contents of which are incorporated herein by reference.

BACKGROUND (a) Technical Field

The present invention relates to a method for controlling engine torque in a hybrid vehicle. More particularly, the present invention relates to a method for controlling engine torque in a hybrid vehicle, in which a point of time when an intake cam is activated is determined such that an engine demand torque is controlled to a level at which system efficiency is maximized within a limited engine output range before activation of the intake cam and the engine demand torque is controlled to a level at which the system efficiency is maximized after activation of the intake cam.

(b) Background Art

Generally, a hybrid vehicle can be defined as a vehicle that employs an electric motor as an auxiliary power source as well as an internal combustion engine to provide a reduction in exhaust gas and an improvement in fuel efficiency. Typically, a hybrid vehicle includes an electric vehicle (EV) mode, which is a pure electric vehicle mode using only the power of the motor, a hybrid electric vehicle (HEV) mode, which is an auxiliary mode using the rotational force of the motor as an auxiliary power source with the use of the rotational force of the engine as a main power source, and a regenerative braking (RB) mode, in which braking energy or inertia energy of the vehicle produced by braking or during driving by inertia is suitably recovered by power generation of the motor and charged in a battery.

In the hybrid vehicle, as the EV mode and the HEV mode are repeatedly switched, and the engine is frequently turned on and off during driving. The engine in a hard HEV is more frequently turned on and off during driving than the engine in a soft HEV.

In particular examples, for example in the case of the hard HEV, the number of times when the engine is turned on and off during driving, in accordance with the federal test procedure 75 (FTP-75), which is a test mode for measuring fuel efficiency, is more than several times.

In the hard HEV, during switching from the EV mode, in which the engine is turned off, to the HEV mode, no impact may be applied to the vehicle if torque input to a transmission is constant. Accordingly, for this purpose, it is necessary to reduce the motor torque and increase the engine torque to make the transmission input torque constant as shown in the exemplary torque diagram of FIG. 1.

In the hard HEV, during the shift to the HEV mode after the vehicle is driven in the EV mode, a mode during which the engine is turned off, it takes a predetermined amount of time until the oil pressure in the engine reaches a predetermined level that is similar to that of a gasoline vehicle, which occurs repeatedly under the condition where the engine is turned off. Accordingly, during shifting from the EV mode to the HEV mode, in order to satisfy driver demand torque, i.e., in order to make the transmission input torque constant, a high engine torque is required.

Accordingly, suitably high engine torque is required to allow the operating condition of the HEV mode to be at maximum system efficiency. Accordingly, in the HEV mode, the engine generates a high torque, and the motor charges a main battery, in preparation for the operations of electrical loads and the next EV mode condition.

During switching from the HE mode, in which the engine is turned off, to the HEV mode, the engine oil pressure is not activated for a period of within several seconds, and the operation of the intake cam included in an intake variable valve timing mechanism is considerably unlikely, and thus the engine generates less than 70% of the maximum torque that the engine actually has.

For example, as shown in the exemplary torque diagram of FIG. 2, since the intake cam included in the intake variable valve timing mechanism of the engine is not operated before the engine oil pressure reaches a predetermined level, the engine torque is temporarily insufficient, and thus the transmission input torque is not maintained suitably constant during switching from the EV mode to the HEV mode.

Accordingly, as the transmission input torque is not maintained constant temporarily, an impact or vibration is applied to the vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a method for controlling engine torque in a hybrid vehicle, in which a point of time when an intake cam is activated as an engine oil pressure reaches a suitably predetermined level is preferably determined during switching from an EV mode to a HEV mode in the hybrid vehicle such that an engine demand torque is controlled to a level at which system efficiency is maximized within a limited engine output range before activation of the intake cam and the engine demand torque is controlled to a level at which the system efficiency is suitably maximized after activation of the intake cam.

In one aspect, the present invention provides a method for suitably controlling engine torque in a hybrid vehicle, the method preferably comprising: generating torque from an engine during switching from an electric vehicle mode to a hybrid electric vehicle mode; determining whether an engine oil pressure reaches a predetermined level; suitably limiting an engine demand torque below a level at which system efficiency is maximized, if the engine oil pressure is below a predetermined level; and requesting the engine demand torque to a level at which the system efficiency is maximized, if the engine oil pressure reaches the predetermined level.

In a preferred embodiment, the step of determining whether the engine oil pressure reaches the suitably predetermined level is preferably performed by determining whether an intake cam is activated.

In another preferred embodiment, if the engine oil pressure is below the suitably predetermined level, the engine demand torque is preferably controlled to a level at which the system efficiency is maximized within an engine output before the intake cam is activated.

In still another preferred embodiment, the step of determining whether the intake cam is activated preferably comprises: measuring the engine oil pressure; measuring the time required until a suitably effective oil pressure is achieved in the intake cam; inputting the measured time to an engine control unit, preferably as a mapping data; and determining, at the engine control unit, that the intake cam has been suitably activated if the measured time elapses after the engine is operated.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
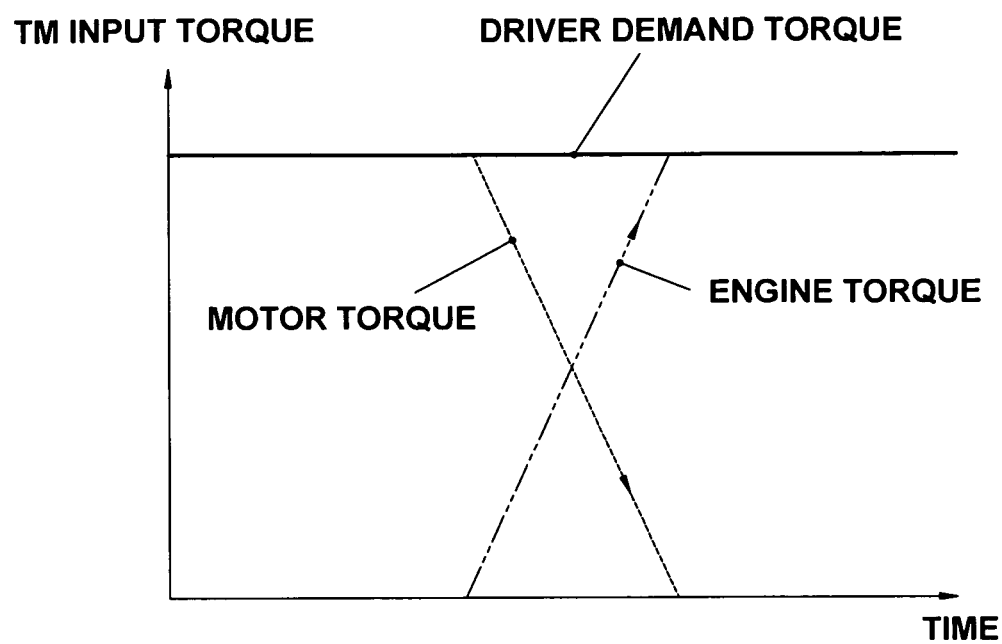
FIG. 1 is a torque diagram illustrating that a transmission input torque should be maintained considerably constant during switching from an EV mode to a HEV mode in a hybrid vehicle.
Figure 2:
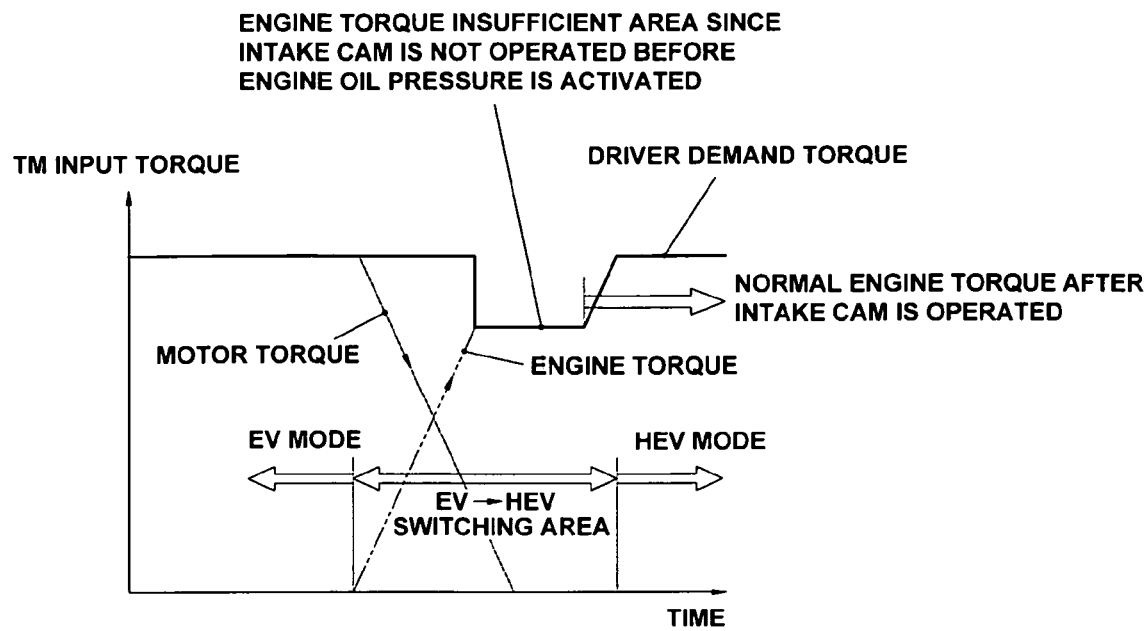
FIG. 2 is a torque diagram illustrating that the transmission input torque is not maintained considerably constant during switching from the EV mode to the HEV mode in the hybrid vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the invention features a method for controlling engine torque in a hybrid vehicle, the method comprising generating torque from an engine during switching from an electric vehicle mode to a hybrid electric vehicle mode, determining whether an engine oil pressure reaches a predetermined level; and limiting an engine demand torque if the engine oil pressure is below the predetermined level.

In one embodiment, engine demand torque is limited below a level at which system efficiency is maximized, if the engine oil pressure is below a predetermined level. In another embodiment, the method further comprises the step of requesting the engine demand torque to a level at which the system efficiency is maximized, if the engine oil pressure reaches the predetermined level. In a further embodiment, determining whether the engine oil pressure reaches the predetermined level is performed by determining whether an intake cam is activated.

In still another further embodiment, determining whether the intake cam is activated comprises measuring the engine oil pressure, measuring the time required until an effective oil pressure is achieved in the intake cam, inputting the measured time to an engine control unit, and determining, at the engine control unit, that the intake cam has been activated if the measured time elapses after the engine is operated.

In another embodiment, the measured time to an engine control unit is inputted as a mapping data.

In still another embodiment, if the engine oil pressure is below the predetermined level, the engine demand torque is controlled to a level at which the system efficiency is maximized within an engine output before the intake cam is activated.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As described herein, in certain embodiments, the present invention may be described as having a characteristic feature in that a point of time when an intake cam is preferably activated when an engine oil pressure reaches a suitably predetermined level is preferably determined by a hybrid control unit (HCU). In further embodiments, the point of time when an intake cam is preferably activated when an engine oil pressure reaches a suitably predetermined level is preferably determined by a HCU such that engine and motor torque are suitably controlled to a level at which system efficiency is preferably maximized within a limited engine output range, preferably before activation of the intake cam and the engine and motor torque are suitably controlled to a level at which the system efficiency is maximized in view of the engine and motor efficiency after activation of the intake cam, and thus maintain a transmission input torque according to a driver demand torque at a substantially constant level.

In further embodiments, for a better understanding of the present invention, an intake valve preferably including an intake cam will be briefly described below taking an example of a gasoline engine.

For example, in a gasoline vehicle suitably equipped with an intake variable valve timing (IVVT) mechanism, preferably including an intake cam at the side of an intake manifold of the engine or a continuous variable valve timing (CVVT) mechanism, the operation of the IVVT mechanism is preferably made at a point of time when an engine oil pressure is activated, for example 3 to 8 seconds, preferably 4 to 5 seconds after the engine is started at room temperature of approximately 22 to 28° C., preferably 25° C. In certain preferred embodiments, after the engine is started, the operation of the IVVT mechanism is always performed until the engine is turned off, and it is possible to freely control the operation of the IVVT mechanism according to vehicle operation conditions (for example, power performance or fuel efficiency performance).

Next, an exemplary method for suitably controlling engine torque in a hybrid vehicle using a point of time when the above-described intake cam is activated in accordance with preferred embodiments of the present invention will be described.

Figure 3:
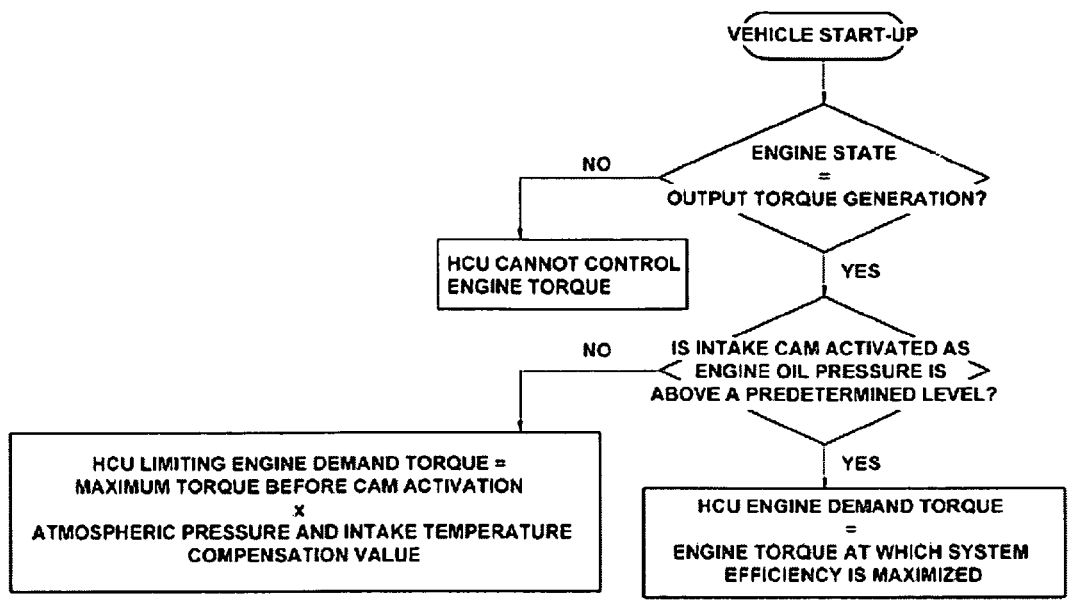
FIG. 3 is a flowchart illustrating a method for controlling engine torque in a hybrid vehicle in accordance with the present invention.

FIG. 3 is a flowchart illustrating an exemplary method for controlling engine torque in the hybrid vehicle in accordance with certain preferred embodiments of the present invention.

A hybrid control unit (HCU), which is suitably a main controller of the hybrid vehicle, should preferably accurately grasp a driver's intention (preferably the driver demand torque) to appropriately distribute the driver demand torque to the engine and the motor. For this purpose, it is preferred according to the invention that the HCU should know a suitably available torque that the engine can output at present to command an engine demand torque below the available torque, and, accordingly, the command is available only when the engine can generate torque.

Preferably, in a state where the engine can generate torque, i.e., during switching from an EV mode, in which the engine is turned off, to a HEV mode, the engine of the hybrid vehicle generates torque.

For example, in a case where there is a driver's driving intention, the HCU preferably sends the engine an engine demand torque, and then the engine generates a suitable output torque in accordance with the engine demand torque.

In a case where there is no driver's driving intention (for example, in a state where the engine is stopped or under any suitable condition other than engine part load), even though the HCU requests the engine to generate torque, the engine does not respond to the HCU's request.

In other embodiments, when the engine generates output torque, a step of determining whether the engine oil pressure reaches a suitably predetermined level is performed, and this step is performed by determining whether the intake cam is activated.

In the step of determining whether the intake cam is activated, preferably the engine oil pressure is first measured by a pressure sensor suitably mounted in the engine during manufacturing, and then the time required until an effective oil pressure is achieved in the intake cam is suitably measured.

In further preferred embodiments of the invention, the thus measured time is preferably input to an engine control unit (ECU) as a mapping data and, after a predetermined time elapses from the operation of the engine, i.e., after the time required until the oil pressure is achieved in the intake cam elapses, the ECU determines that the intake cam has been activated and preferably sends a corresponding signal to the HCU.

In further preferred embodiments, if the engine oil pressure is below a suitably predetermined pressure, for example, if the intake cam is not activated, the HCU controls the engine demand torque to a level at which the system efficiency is suitably maximized within the limited engine output. For example, the HCU controls the engine demand torque within a maximum torque preferably before the intake cam is activated.

Preferably, he HCU receives a suitable atmospheric pressure and intake temperature compensation signal from the ECU and preferably controls the engine demand torque to be substantially limited to the maximum torque before the intake cam is activated in consideration of a change in the engine torque according to external environmental conditions of the engine.

In other embodiments, if the engine oil pressure reaches a suitable predetermined level, i.e., if the intake cam is preferably activated, the HCU controls the engine demand torque to a level at which the system efficiency is maximized.

As described herein, the method for controlling engine torque in the hybrid vehicle in accordance with preferred embodiments of the present invention provides the following effects.

According to preferred embodiments of the present invention, the point of time when the intake cam is preferably activated as the engine oil pressure reaches a suitably predetermined level is determined during switching from the EV mode to the HEV mode in the hybrid vehicle such that the engine demand torque is controlled to a level at which the system efficiency is maximized within a limited engine output range before activation of the intake cam and the engine demand torque is controlled to a level at which the system efficiency is maximized after activation of the intake cam. As a result, during switching from the EV mode to the HEV mode in the hybrid vehicle, the transmission input torque according to the driver demand torque is maintained at a suitably constant level, and thus it is possible to suitably prevent an impact or vibration from being applied to the vehicle.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling engine torque in a hybrid vehicle, the method comprising:
   generating torque from an engine with use of a control unit while switching from an electric vehicle mode to a hybrid electric vehicle mode;
   determining with use of the control unit whether an engine oil pressure reaches a predetermined level;
   in response to determining that the engine oil pressure is below a predetermined level, limiting an engine demand torque below a level at which system efficiency is maximized; and
   in response to determining the engine oil pressure has reached the predetermined level, controlling with use of the control unit the engine demand torque to a level at which the system efficiency is maximized,
   wherein determining whether the engine oil pressure has reached the predetermined level is determined by determining whether an intake cam is activated, and
   wherein determining whether the intake cam is activated includes:
      measuring the engine oil pressure at the intake cam;
      measuring the time required until an effective oil pressure is achieved in the engine so that the intake cam becomes movable;
      inputting the measured time to an engine control unit in a form of mapping data; and
      determining, at the engine control unit, that the intake cam has been activated when the measured time has elapsed after the engine is operated.

2. The method of claim 1, wherein, if the engine oil pressure is below the predetermined level, the engine demand torque is controlled to a level at which the system efficiency is maximized within a range of an engine output before the intake cam is activated.

3. The method of claim 1, wherein, if the engine oil pressure is below the predetermined level, the engine demand torque is controlled to a level at which the system efficiency is maximized within a range of an engine output before the intake cam is activated.

4. A method for controlling engine torque in a hybrid vehicle, the method comprising:

generating torque from an engine with use of a control unit during switching from an electric vehicle mode to a hybrid electric vehicle mode;

determining with use of a control unit whether an engine oil pressure reaches a predetermined level; and limiting an engine demand torque if the engine oil pressure is below the predetermined level wherein determining whether the engine oil pressure reaches the predetermined level is determined by determining whether an intake cam is activated, and wherein determining whether the intake cam is activated includes:

measuring the engine oil pressure;

measuring the time required until an effective oil pressure is achieved in the engine so that the intake cam becomes movable;

inputting the measured time to an engine control unit in a form of mapping data; and determining, at the engine control unit, that the intake cam has been activated when the measured time has elapsed after the engine is operated.

5. The method of claim 4, wherein engine demand torque is limited below a level at which system efficiency is maximized, if the engine oil pressure is below a predetermined level.

6. The method of claim 4, further comprising the step of requesting the engine demand torque to a level at which the system efficiency is maximized, if the engine oil pressure reaches the predetermined level.

7. The method of claim 4, wherein the measured time to an engine control unit is inputted as a mapping data.

* * * * *